United States Patent
Rytlewski et al.

(10) Patent No.: US 8,853,879 B2
(45) Date of Patent: Oct. 7, 2014

(54) SYSTEM AND METHOD FOR DOWNHOLE POWER GENERATION AND SELECTIVE INTERRUPTION OF A MAGNETIC FIELD

(75) Inventors: Gary L. Rytlewski, League City, TX (US); Ozgur Pulat, Missouri City, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 567 days.

(21) Appl. No.: 12/705,771

(22) Filed: Feb. 15, 2010

(65) Prior Publication Data

US 2011/0198848 A1 Aug. 18, 2011

(51) Int. Cl.
 H02K 19/36 (2006.01)
 H02K 7/18 (2006.01)
 H02P 9/02 (2006.01)
 H02K 19/16 (2006.01)
 H02K 11/00 (2006.01)

(52) U.S. Cl.
 CPC ............ H02K 7/1823 (2013.01); H02K 19/36 (2013.01); H02K 19/16 (2013.01); H02K 11/0094 (2013.01); H02P 9/02 (2013.01)
 USPC ......................................................... 290/54

(58) Field of Classification Search
 CPC ............ H02K 7/1823; H02K 11/0094; H02K 16/025; H02K 17/34; H02K 19/16; H02K 19/36; H02K 49/043; H02P 9/02; E21B 41/0085; E21B 4/04; E21B 7/068; F04D 13/10; F04D 15/0066
 See application file for complete search history.

(56) References Cited

U.S. PATENT DOCUMENTS

| 3,036,645 | A | * | 5/1962 | Rowley | 175/93 |
| 3,132,296 | A | * | 5/1964 | Nippes | 322/58 |
| 3,683,249 | A | * | 8/1972 | Shibata | 318/730 |
| 3,702,965 | A | * | 11/1972 | Drexler et al. | 322/25 |
| 4,246,531 | A | * | 1/1981 | Jordan | 322/28 |
| 4,486,801 | A | * | 12/1984 | Jackovich et al. | 361/21 |
| 5,517,464 | A | | 5/1996 | Lerner et al. | |
| 5,959,380 | A | * | 9/1999 | Gillett et al. | 310/54 |
| 6,092,610 | A | | 7/2000 | Kosmala et al. | |
| 7,863,868 | B2 | * | 1/2011 | Xu et al. | 322/44 |
| 2004/0140726 | A1 | * | 7/2004 | Spring | 310/166 |
| 2006/0022840 | A1 | * | 2/2006 | Spring | 340/854.3 |
| 2008/0303490 | A1 | * | 12/2008 | Xu et al. | 322/29 |
| 2009/0316528 | A1 | | 12/2009 | Ramshaw et al. | |
| 2012/0139250 | A1 | * | 6/2012 | Inman et al. | 290/52 |

FOREIGN PATENT DOCUMENTS

WO 2004059185 A1 7/2004

* cited by examiner

*Primary Examiner* — Tulsidas C Patel
*Assistant Examiner* — S. Mikailoff
(74) *Attorney, Agent, or Firm* — David J. Groesbeck; Brandon S. Clark

(57) ABSTRACT

A technique facilitates generation of electric power in well environments. The technique involves combining a cooperating stator and rotor assembly to create an electromagnetic generator. The cooperating stator and rotor assembly utilize an electromagnet which works with a generator coil to create electrical power. Use of the electromagnet enables the electromagnetic field created during generation of electrical power to be selectively eliminated. Elimination of the electromagnetic field allows magnetic particles to be freely flushed from the electromagnetic generator.

14 Claims, 3 Drawing Sheets

SYSTEM AND METHOD FOR DOWNHOLE POWER GENERATION AND SELECTIVE INTERRUPTION OF A MAGNETIC FIELD

BACKGROUND

The following descriptions and examples are not admitted to be prior art by virtue of their inclusion in this section.

A variety of power generators are used in many types of well related applications to generate electric power for use downhole. In some well drilling and/or measurement applications, electricity is generated by power generators which have permanent magnets rotating about stator coils. Because of the permanent magnets, a permanent magnetic field exists in the region of the power generator, and this magnetic field can cause magnetic particle accumulation in an exposed generator design. If sufficient magnetic particles accumulate, components within the power generator are susceptible to damage and ultimate failure. For example, some power generators allow drilling mud to flow between the rotor and stator during the downhole application and this can lead to magnetic particle build up in areas susceptible to damage within the power generator.

SUMMARY

In general, embodiments of the present disclosure comprise a system and methodology for generating electric power in well environments. The system and methodology employ a cooperating stator and rotor assembly to create an electromagnetic generator that may be positioned in a well environment. The cooperating stator and rotor assembly utilize an exposed electromagnet that works with a generator coil to create electrical power. Use of the electromagnet enables the electromagnetic field created during the generation of electrical power to be selectively eliminated. Elimination of the electromagnetic field allows magnetic particles to be freely flushed from the electromagnetic power generator.

Other or alternative features will become apparent from the following description, from the drawings, and from the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Figure 1:
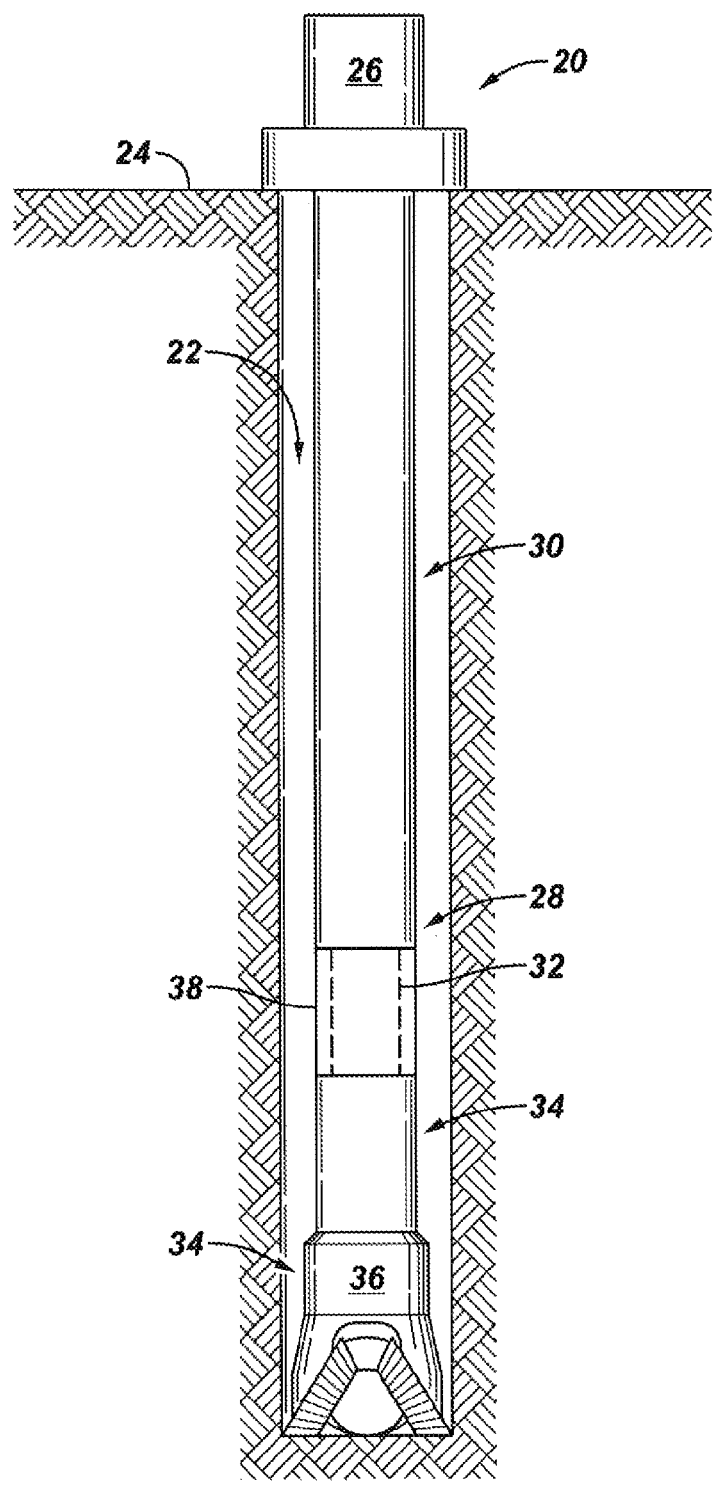
FIG. 1 is a schematic view of one example of a well system having an electromagnetic power generator, according to an embodiment of the present disclosure.

In the following description, numerous details are set forth to provide an understanding of various embodiments of the present disclosure. However, it will be understood by those of ordinary skill in the art that the embodiments of the present disclosure may be practiced without these details and that numerous variations or modifications from the described embodiments may be possible. In the specification and appended claims: the terms "connect", "connection", "connected", "in connection with", "connecting", "couple", "coupled", "coupled with", and "coupling" are used to mean "in direct connection with" or "in connection with via another element"; and the term "set" is used to mean "one element" or "more than one element". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the present disclosure.

Embodiments of the present disclosure generally relate to a system and methodology for generating power in desired environments, such as downhole well environments. In one embodiment, an electromagnetic power generator is deployed downhole in a flow of fluid routed through a tubular housing in a wellbore. The flow of fluid can be used to power the rotation of a rotor assembly of the power generator so as to provide electrical power for downhole components. The power generator is designed with one or more electromagnets that reduce or negate the need for permanent magnets that would otherwise be used for enabling generation of electrical power.

According to one example, the power generator is designed as an exposed fluid bearing style turbine generator in which the magnetic field acting in the turbine generator may be selectively turned on and off. As described in greater detail below, use of electromagnets enables control over the magnetic field by selectively controlling power to the electromagnets. Control over the magnetic field is helpful in enhancing the operation and longevity of the power generator. For example, when the magnetic field is turned off, magnetic particles may be flushed from the system, e.g. flushed from the gap between a stator and rotor assembly of the electromagnetic power generator. Additionally, use of electromagnets also enables easier regulation of electric power at lower current and voltage.

The power generator is useful in numerous types of well applications. In a completion system, for example, the power generator may be used to extract hydraulic power from a flowing fluid and to convert that hydraulic power to usable electric power. By avoiding the use of permanent magnets, the power generator becomes much more amenable to long-term use in this type of relatively harsh environment. Selective elimination of the magnetic field acting in the power generator allows magnetic particles to be flushed from the power generator to avoid jamming rotational components due to particle buildup. Removal of magnetic particles also limits magnetic field degradation that would otherwise occur due to particle accumulation. Accordingly, many types of failure modes can be better controlled or eliminated which renders the power generator useful in permanent completion systems and in a variety of other well systems utilized downhole for substantial periods of time.

Referring generally to FIG. 1, one example of a well system 20 is illustrated as deployed in a wellbore 22 that extends generally from a surface location 24. In many applications, wellbore 22 extends downwardly from a wellhead 26 or other surface structure. In the example illustrated, well equipment 28, e.g. a completion system, is deployed downhole as part of a well string 30. The well string 30 may be formed as a tubing string or other suitable string designed for a given a well operation. Regardless, a power generator 32 is employed as part of or in cooperation with the well equipment 28 to provide electrical power to specific components 34 of well equipment 28.

In some applications, well equipment 28 may be part of a drill string in which one of the components 34 is a drill assembly 36 used to drill wellbore 22. During the drilling operation, a flow of drilling mud is moved past drill assembly 36, and this flow of drilling mud is used to hydraulically power generator 32 to enable production of electric power for one or more of the components 34. It should be noted, however, that a variety of fluid flows may be used to provide hydraulic power to generator 32 in many types of well operations. For example, flows of production fluid, injection fluid, and other types of applicable fluid flows may be used to facilitate creation of electric power with power generator 32.

Figure 2:
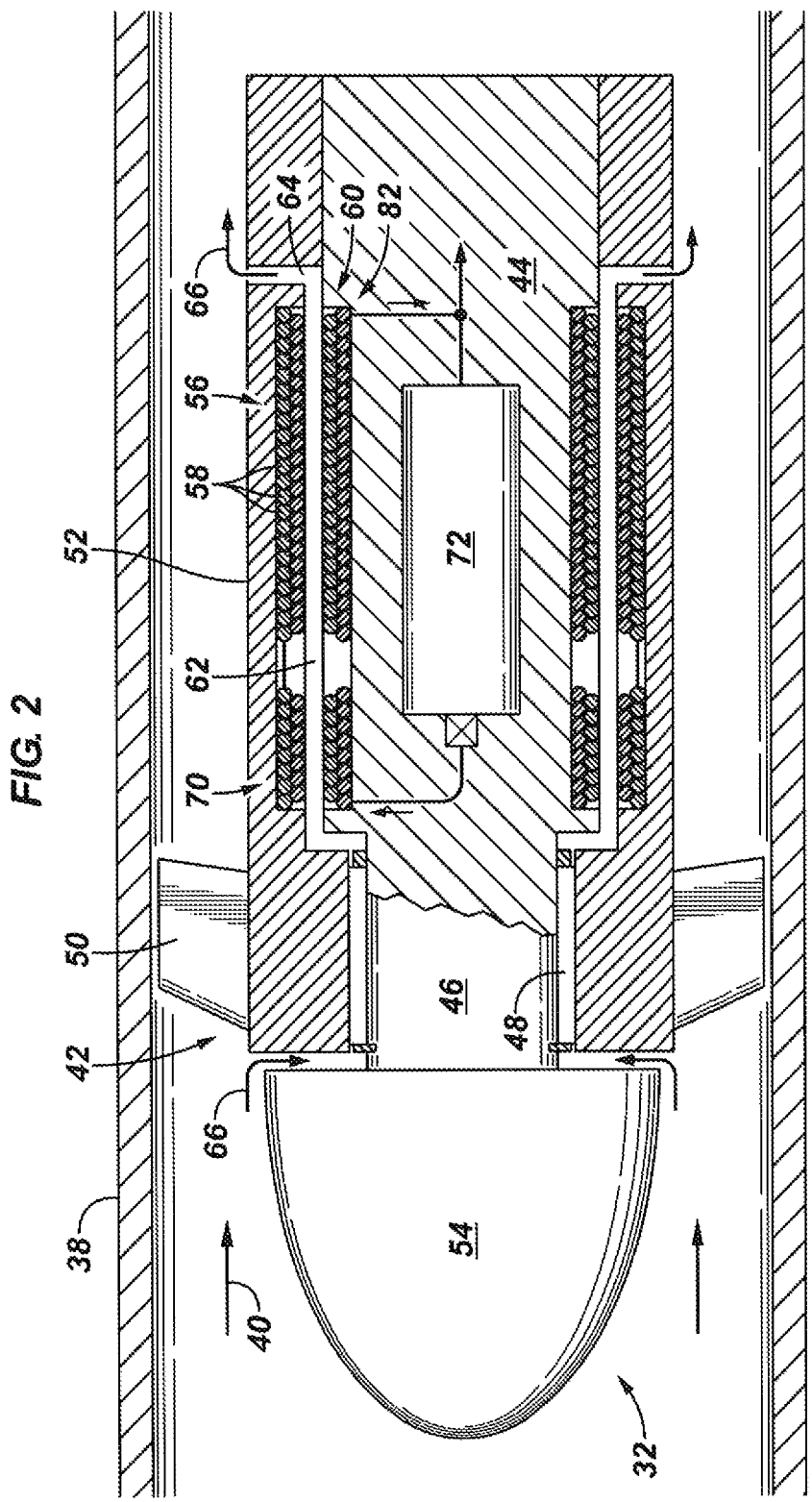
FIG. 2 is a schematic illustration of one example of the electromagnetic power generator illustrated in FIG. 1, according to an embodiment of the present disclosure.

Referring generally to FIG. 2, an example of power generator 32 is illustrated. In this example, power generator 32 is a turbine type power generator deployed in a tubular structure 38, such as a tubing used in well string 30. A flow of fluid, as represented by arrow 40, moves within tubular structure 38 and past power generator 32 to impart hydraulic power to the generator 32

In the embodiment illustrated, power generator 32 comprises a rotor assembly 42 that moves relative to a stator 44 along a film of fluid between the two components, e.g. rotates about stator 44. By way of example, stator 44 may be stationary and formed with a stationary core 46 about which rotor assembly 42 is rotatably guided via a bearing assembly 48. The rotary assembly 42 may also rotate around the stator 44 via a hydrodynamic fluid film without any guidance from a bearing assembly. In this embodiment, rotor assembly 42 comprises impeller members 50, e.g. blades, which extend generally radially outward from a base structure 52 of rotor assembly 42 toward the surrounding tubular structure 38. As the flow of fluid 40 moves past impeller members 50, the energy of the flowing fluid impacting on impeller members 50 causes the rotor assembly 42 to rotate about stator 44. A nose cone 54 may be mounted at the upstream end of stator 44 and rotor assembly 42 to direct the flowing fluid 40 past impeller members 50. This generator would also work with an upstream stator assembly to shape the flow before spinning the rotor.

Referring again to FIG. 2, rotor assembly 42 comprises one or more electromagnets 56 that may be positioned along a radially inward surface of base structure 52. As illustrated, the electromagnet 56 is formed from a conductive coil 58 that creates the desired magnetic field upon receipt of an electric current. The electromagnet 56 cooperates with an inner power generation coil 60 that forms part of stator 44. The inner power generation coil 60 is positioned radially inward of electromagnet 56 across a separation gap 62, as further illustrated in FIG. 3. As the flow of fluid 40 moves past impeller members 50, rotor assembly 42 is moved relative to stator 44 which, in turn, moves the electromagnet 56 past power generation coil 60. If current is supplied to coil 58 of electromagnet 56 to create a magnetic field, the relative movement causes inner power generation coil 60 to output electric power.

In the illustrative embodiment, separation gap 62 is part of a flow channel 64 through which a portion of flowing fluid 40 is directed, as represented by arrows 66. Any accumulation of magnetic particles within gap 62 or along other regions of rotor assembly 42 and stator 44 may be cleared by fluid flows 40, 66 when the magnetic field created by electromagnet 56 is eliminated or removed. The magnetic field is easily and selectively eliminated simply by cutting the flow of electric current to electromagnet 56 that is otherwise used to create the electromagnetic field necessary for the production of electrical power via generation coil 60.

The design of power generator 32 enables use of the power generator in applications that do not require any special seals. Consequently, contaminated fluids are allowed to pass along the power generator and through the gap 62 between rotor assembly 42 and stator 44. The ability to remove the magnetic field enables flushing of the system, which increases the life of the power generator 32 by eliminating or reducing premature failure and/or degradation of the magnetic fields that would otherwise have occurred due to magnetic particle buildup.

The specific arrangement of electromagnets and power generation coils can be changed to accommodate specific applications, size envelopes, power requirements, types of fluid flow, and other factors. For example, electromagnet 56 could be placed on a stationary portion while the inner power generation coil 60 is moved, because it is the relative movement between the two that generates the desired electrical power. Additionally, the electrical power/current supplied to electromagnet 56 to create the magnetic field also may be supplied via a variety of systems and components.

Figure 3:
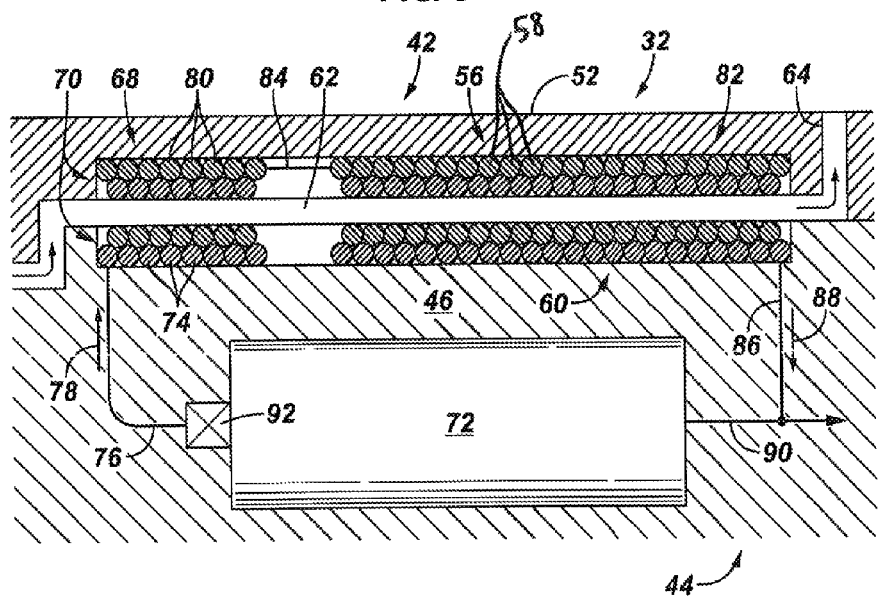
FIG. 3 is an enlarged section of the electromagnetic power generator illustrated in FIG. 2, according to an embodiment of the present disclosure.

One example of an excitation system 68 for supplying electric current to excite coil 58 of electromagnet 56 is best illustrated in FIG. 3. In this example, excitation system 68 comprises an excitation coil assembly 70 that receives power from a power storage device 72 positioned at a desirable location, e.g. within stationary core 46 of stator 44. Power storage device 72 may comprise a battery, such as a rechargeable battery, or another suitable power source. In some applications, electric current may be routed downhole to the excitation coil assembly 70.

As illustrated, power storage device 72 is electrically coupled with an inner excitation coil 74 of excitation coil assembly 70 via a suitable electric line 76. Electric current flows from power storage device 72 to inner excitation coil 74 to excite excitation coil assembly 70, as represented by arrow 78. In the example illustrated, the inner excitation coil 74 is located in the stationary stator 44 and cooperates with an outer excitation coil 80. The outer excitation coil 80 is located in rotor assembly 42 at a position radially outward of inner excitation coil 74 across separation gap 62.

The primary operation of power generator 32 begins with excitation coil assembly 70 receiving electrical power from power storage device 72. The excitation coils 74, 80 are small so the current and voltage supplied by power storage device 72 is minimal. In operation, the electrical power flows to inner excitation coil 74 via electric line 76 and the electromagnetic field created is received by the rotating outer excitation coil 80 in rotor assembly 42. The outer excitation coil 80 is directly coupled to a generator coil assembly 82 that comprises outer coil 58 (of electromagnet 56) and power generation coil 60. For example, the outer excitation coil 80 may be electrically coupled with the outer generation coil 58 via a conductive link 84.

During rotation of rotor assembly 42 about stationary stator 44, the flow of electric current from power storage device 72 to inner excitation coil 74 creates the magnetic field that acts on the rotating outer excitation coil 80. The magnetic field causes outer excitation coil 80 to produce an electric current that flows to outer generation coil 58 via conductive link 84. The outer generation coil 58 then effectively becomes the electromagnetic 56 that creates the power generating magnetic field. The power generating magnetic field, in turn, acts on inner power generation coil 60 to create electrical power for powering desired downhole devices. The electric current may be directed to desired downhole devices via one or more suitable electric lines 86 designed to deliver the electric power, as represented by arrow 88. At least some of the power generated by inner power generation coil 60 may be directed back to power storage device 72 via electric line 90 to recharge the power storage device.

In this type of system, the power input by power storage device 72 to excitation coil assembly 70 is amplified because the size of the coils in the generator coil assembly 82 is substantially larger than the coils in the excitation coil assembly 70. In addition, the excitation coil assembly 70 may function to regulate the magnetic field strength and therefore may be used to regulate the output voltage. The voltage regulation aspect of this configuration of the excitation coil assembly 70 of power generator 32 is typically not provided in this form in known generators and alternators.

With the type of system described above, the magnetic field may be selectively turned off and on even as rotor assembly 42 is rotated by flowing fluid 40. The ability to selectively eliminate the magnetic field facilitates cleaning of generator 32 by enabling flushing of magnetic particles from the power generator. For example, the magnetic field may be periodically eliminated, e.g. turned off, to allow the flowing fluid 66 moving through flow channel 64 to remove magnetic particles from the gap region 62 between stator 44 and rotor assembly 42. By flushing the system, product life is increased and premature failure and/or degradation of magnetic fields due to particle buildup is reduced or eliminated.

The magnetic field may be selectively eliminated by a variety of techniques and mechanisms. For example, delivery of excitation power to excitation coil assembly 70 from power storage device 72 may be controlled by enabling interruption of electric power delivered via electric line 76. In one example, a remotely controlled switch 92 may be used to control the flow of electric power between power storage device 72 and excitation coil assembly 70. However, other devices, systems and techniques may be utilized to effectively control the excitation energy and the creation of magnetic fields in power generator 32.

Well system 20 may be constructed in a variety of configurations for use with many types of well applications and environments. The power generator may be deployed in various types of tubular structures, such as well tubing, or in other tubular structures used to conduct a flow of fluid. Additionally, the power generator may be deployed in tubular structures disposed within a wellbore or disposed at other locations for use in facilitating a given well application. Also, the size and arrangement of the excitation coils and power generation coils may be adjusted according to the parameters of a specific well application. The excitation energy source may be supplied by a battery or by other types of power sources located in the stator or at other suitable locations. Depending on the application and the power requirements, the size, materials, and configuration of the power generator may be adjusted as desired to accomplish the goals of a given well application.

Elements of the embodiments have been introduced with either the articles "a" or "an." The articles are intended to mean that there are one or more of the elements. The terms "including" and "having" are intended to be inclusive such that there may be additional elements other than the elements listed. The term "or" when used with a list of at least two elements is intended to mean any element or combination of elements.

Although only a few illustrative embodiments of the present invention have been described in detail above, those of ordinary skill in the art will readily appreciate that many modifications are possible without materially departing from the teachings of this invention. Accordingly, such modifications are intended to be included within the scope of this disclosure as defined in the claims.

What is claimed is:

1. A well system, comprising:
    a well tubing through which a flow of fluid is conducted; and
    an electromagnetic generator disposed in the well tubing, the electromagnetic generator comprising:
    a rotor assembly having impeller members disposed in the flow of fluid to cause rotation of the rotor assembly;
    a power storage device;
    an excitation coil assembly comprising an inner excitation coil and an outer excitation coil, wherein the inner and outer excitation coils are paired in a rotor-stator relationship, and wherein the excitation coil assembly is selectively, electrically connected to the power storage device;
    a stator comprising a stationary core with the power storage device positioned within the stationary core, the stator being positioned within the rotor assembly such that the rotor assembly is rotatable about the stator and the power storage device, the power storage device supplying power for the excitation coil assembly; and
    a generator coil assembly electrically connected to the excitation coil assembly, wherein the generator coil assembly comprises an inner generator coil and an outer generator coil, wherein the inner and outer generator coils are paired in a rotor-stator relationship, the generator coil assembly generating electrical power during rotation of the rotor assembly when powered by the excitation coil assembly, wherein electromagnetic fields in the electromagnetic generator may be selectively eliminated by interrupting flow of electrical power from the power storage device to the excitation coil assembly to enable flushing of magnetic particles from the electromagnetic generator by the flow of fluid.

2. The system as recited in claim 1, wherein the well tubing comprises well tubing deployed in a tubing string located in a wellbore.

3. The system as recited in claim 1, wherein the rotor assembly is mounted on a bearing assembly for rotation about the stationary core.

4. The system as recited in claim 1, wherein the inner excitation coil is mounted along the stationary core and electrically connected to the power storage device.

5. The system as recited in claim 4, wherein the outer excitation coil is mounted in the rotor assembly at a position radially outward of the inner excitation coil.

6. The system as recited in claim 5, wherein the outer generator coil is mounted in the rotor assembly and electrically connected to the outer excitation coil.

7. The system as recited in claim 6, wherein the inner generator coil is mounted along the stationary core at a position radially inward of the outer generator coil.

8. The system as recited in claim 7, wherein the inner generator coil is electrically coupled with the power storage device to recharge the power storage device.

9. The system as recited in claim 1, further comprising a switch controllable to cut off the flow of electrical power from the power storage device to the excitation coil assembly during elimination of the magnetic fields.

10. A method of generating power in a well, comprising:
    locating an electromagnet in a rotor assembly;
    providing a power storage unit;

combining a stator and the rotor assembly such that the rotor assembly is rotatable about the stator to create an electromagnetic generator, the stator comprising a stationary core with the power storage unit positioned within the stationary core, the power storage unit supplying power for an excitation coil assembly;

electrically coupling the power storage unit across a switch to the excitation coil assembly, the excitation coil assembly having an inner excitation coil and an outer excitation coil, wherein the inner and outer excitation coils are paired in a rotor-stator relationship, and wherein the excitation coil assembly is selectively, electrically connected to the power storage unit via the switch;

positioning a stationary power generation coil in the stator adjacent the electromagnet, wherein the power generation coil and the electromagnet form a generator coil assembly;

electrically coupling the excitation coil assembly and the generator coil assembly;

using a flow of fluid in a well to rotate the rotor assembly, thus moving the electromagnet about the stationary power generation coil to generate electrical power;

selectively operating the switch to temporarily interrupt the electrical coupling between the excitation coil assembly and the power storage unit to interrupt a magnetic field along the rotor assembly; and flushing magnetic particles from a gap between the rotor assembly and the stator while the electrical coupling between the excitation coil assembly and the power storage unit is temporarily interrupted.

11. The method as recited in claim 10, wherein flushing comprises flushing the magnetic particles with the flow of fluid.

12. The method as recited in claim 10, further comprising using at least a portion of the electrical power generated to recharge the power storage unit.

13. A method of generating power, comprising:

combining a stator and a rotor assembly such that the rotor assembly is rotatable about the stator to create an electromagnetic generator, the stator comprising a stationary core with a power storage device positioned within the stationary core, the power storage device supplying power for an excitation coil assembly;

positioning the power storage device in the electromagnetic generator;

electrically coupling the excitation coil assembly to the power storage device within the electromagnetic generator, wherein the excitation coil assembly comprises an inner excitation coil and an outer excitation coil in a rotor-stator relationship;

electrically connecting a generator coil assembly to the excitation coil assembly to enable generation of electrical power when the excitation coil assembly receives electrical power from the power storage device, wherein the generator coil assembly comprises an inner generator coil and an outer generator coil in a rotor-stator relationship;

providing a switch between the power storage device and the excitation coil assembly;

operating the switch to temporarily interrupt current flow to the excitation coil assembly to thus eliminate a magnetic field in the electromagnetic generator; and flushing a gap between the rotor assembly and the stator to remove magnetic particles while the current flow is temporarily interrupted.

14. The method as recited in claim 13, further comprising mounting the electromagnetic generator in a tubular well structure through which a flow of fluid is conducted to rotate the rotor assembly.

\* \* \* \* \*